United States Patent [19]
Sandelman et al.

[11] Patent Number: 6,152,376
[45] Date of Patent: Nov. 28, 2000

[54] VALVE MODULATION METHOD AND SYSTEM UTILIZING SAME

[75] Inventors: David Sandelman, Chatham; Daniel Shprecher, Highland Lakes, both of N.J.

[73] Assignee: Heat-Timer Corporation, Fairfield, N.J.

[21] Appl. No.: 09/236,430

[22] Filed: Jan. 25, 1999

Related U.S. Application Data

[63] Continuation-in-part of application No. 08/804,740, Feb. 21, 1997, abandoned.

[51] Int. Cl.$^7$ .................................................. G05D 23/275
[52] U.S. Cl. ............................................ 236/68 R; 251/11
[58] Field of Search ............................. 251/11; 236/68 R

[56] References Cited

U.S. PATENT DOCUMENTS

| | | | |
|---|---|---|---|
| 2,943,643 | 7/1960 | Pinter et al. | 236/68 R |
| 3,167,251 | 1/1965 | Kriechbaum | 236/68 R |
| 3,171,596 | 3/1965 | Furlong et al. | 236/68 R |
| 3,400,906 | 9/1968 | Stocklin | 236/68 R |
| 3,515,368 | 6/1970 | Kelly | 251/11 |
| 3,686,857 | 8/1972 | Berg | 236/68 R |
| 4,235,413 | 11/1980 | Baker | 251/11 |
| 5,971,288 | 10/1999 | Davis et al. | 236/68 R |

*Primary Examiner*—William E. Tapolcai
*Attorney, Agent, or Firm*—Levisohn, Lerner, Berger & Langsam

[57] ABSTRACT

A valve modulation method and a system utilizing the method is provided. In a hydronic heating system having primary and secondary loops, a simple two-position valve is powered on an intermittent duty cycle to regulate the amount of flow of boiler water from the primary loop to a radiation system in the secondary loop. The actuator of the valve is pre-powered so that it is fully responsive to this intermittent duty cycle. By only supplying power to the actuator of the valve intermittently, the piston of the valve remains in a partially open position, and allows some flow to pass from the primary loop to the secondary loop. The position of the valve remains constant, owing to the duty cycle being shorter than the response time of the valve. By pre-powering the valve, the lag time it takes for the valve to become responsive to changes in the duty cycle is significantly reduced or eliminated. In this fashion, the temperature of the water in the secondary loop may be controlled.

19 Claims, 9 Drawing Sheets

VALVE MODULATION METHOD AND SYSTEM UTILIZING SAME

RELATED APPLICATIONS

This application is a continuation-in-part of U.S. patent application Ser. No. 08/804,740 filed Feb. 21, 1997 and assigned to the same entity, now abandoned.

BACKGROUND OF THE INVENTION

1. Field of the Invention

This invention relates to a method for modulating or controlling the position of valves used in hydronic heating systems, which systems transfer a heat medium such as water to heat a radiation device to provide radiant heat. Conventionally, such radiant heating systems may be used in the home or commercially, and can be used to heat large areas such as floors or ceilings.

2. Description of Related Art

Conventional hydronic heating systems generally have a primary system in which a boiler is engaged to heat the water and a secondary system into which the water from the primary system flows under certain controlled conditions. Although the system and control method are chiefly herein described with regard to a heating system, they apply equally to a cooling system in which fluid which is cooled is carried to the system in which a cooling effect is to be achieved.

Transfer of a heated or cooled fluid medium between primary and secondary systems is accomplished by means of multi-port control valves to be described below. These valves are generally motor controlled, expensive, and are sometimes difficult to operate when attempting to achieve certain desired heating or cooling effects.

The following is a description of specific prior art hydronic heating systems generally employed. In this description, reference is made to FIGS. 1–5.

A conventional hydronic heating system is illustrated in FIG. 1. The system consists of a boiler 1 used to heat a transfer medium (e.g., water), and a pump 2 to move the heated transfer medium from boiler 1 to a transfer device 3 (e.g., radiation) to transfer the heat from the heated medium to the space to be heated. The heated transfer medium is returned to boiler 1 at a lower temperature than it left the boiler after transferring some of its heat to transfer device 3.

In a basic hydronic heating system, boiler 1 heats water to the required temperature needed to be delivered to transfer device 3 used to heat the space. This transfer device typically would be a cast iron vessel or a copper tube with fins that is heated by the passage of heated water through it. In certain applications it is necessary to have the water turned on and off to different areas or zones to be heated. To accomplish this, valves are used in the branch flow to each zone.

FIG. 2 shows the piping arrangement of a multiple zone system. Pump 5 pumps water from boiler 4 to different heating zones 7a, 7b, and 7c. Each piping branch is provided with a zone valve, 6a, 6b, and 6c, respectively. Depending on the state of a zone valve 6a, 6b, or 6c, i.e., whether it is open or closed, heated boiler water is either sent to the corresponding heating zone 7a, 7b, or 7c or blocked. When a zone valve is open, heated water is delivered to a corresponding radiation device, and the zone is heated. When a zone valve is closed, heated water is not delivered to its corresponding radiation device, and the zone is not heated. With this type of control, each zone is controlled solely in an on-off fashion. These valves are generally of the inexpensive solid element type.

FIG. 3 shows an internal view of such a solid element valve. The typical valve possesses a piston 10 movable within valve 11 between open and closed positions. An electric heater 8 is in thermal communication with a cylinder 9. Cylinder 9 is filled with a substance such as wax which expands when heated. When powered, electric heater 8 heats cylinder 9 which expands and displaces piston 10 thereby opening or closing valve 11.

In certain cases, particularly with radiant heat devices, it is desirable to reduce the flow of water to a zone in order to lessen the amount of heat delivered. Since the conventional zone valve does not lend itself easily to a continuously modulating or variable mode of operation, a three-way or four-way valve could be installed for each zone.

FIG. 4 illustrates the piping arrangement of a three-way mixing valve for a single zone; like structures in other zones of a multiple zone system are not illustrated. Depending on the position of the control port in three-way valve 105, all, some, or none of the boiler water flows to radiation system 107. When the control port in three-way valve 105 is positioned so that all of the boiler water flows to radiation system 107 (the 100% position), boiler port 105a is connected to output port 105b, radiation system 107 receives water at the boiler temperature, there is no flow in return port 105c, and all of the flow from radiation system 107 is returned to boiler 104. Thus, when valve 105 is in the 100% position, the system functions no differently than the system shown in FIG. 1. When valve 105 is in a 0% boiler water position, return port 105c is connected to the output port 105b, the radiation system 107 receives water at the returned water temperature of the radiation system, and there is no flow in boiler port 105a. In the 0% boiler position, no heated water from boiler 104 flows to radiation system 107, and the radiation system remains at the ambient temperature.

When the port of the valve is in some mid-way position, some percentage of the flow is through boiler port 105a, and the remaining percentage of the flow is through return port 105c. By blending or mixing the water leaving the boiler with water that has lost some of its heat in the radiation system, water having a temperature lower than that of the boiler water may be supplied to the radiation system. By varying the boiler port position between 0 and 100%, the temperature supplied to the radiation system may be varied between the ambient temperature of the radiation system and the boiler water temperature. In this configuration, the flow through the radiation system remains constant but the flow through the boiler varies with the position of the valve. Varying the flow through the boiler may be problematic, as some boilers are extremely flow-sensitive, and can only operate within a narrow range of flow rates. If varying the flow presents a problem, a four-way valve might be employed to maintain a constant flow through the boiler and radiation system in all valve positions.

The four-way valve is piped into a system as illustrated in FIG. 5. As before, FIG. 5 illustrates the piping arrangement of a four-way valve for a single zone; like structures in other zones of a multiple zone system are not illustrated. When valve 209 is set in a valve position of 100% boiler water, all boiler water flows into boiler port 209a out to radiation system 210 through system supply port 209c, and the water returns from radiation system 210 into system return port 209d and back to boiler 204 via return port 209b. When valve 209 is set in a 0% boiler water valve position, boiler water enters boiler port 209a and returns to boiler 204 through boiler return port 209b, while water in the radiation side of the valve moves out of the system supply port 209c and returns to the valve through system return port 209d. In positions between 0 and 100%, a regulated amount of boiler water mixes with the water moving through the radiation, allowing control of the water temperature going to the radiation between the ambient temperature of the radiation and the boiler water temperature.

The system illustrated in FIG. 5 has what are referred to as primary and secondary loops, with high temperature water flowing through the primary loop (the boiler loop) and lower temperature water flowing through the secondary loop (the radiation). Both systems illustrated in FIGS. 4 and 5 utilize mixing valves, which are expensive and can be complicated to operate.

One known valve control method involves a simple solid element valve having a heatable expandable element as shown in FIG. 3, and consists of varying the duty cycle of the control signal (the "open" command) to the valve. By varying the duty cycle of the control signal to the heater of the valve, the valve can open and close in a variable manner in an attempt to control fluid temperature levels. Such a method is mentioned in U.S. Pat. No. 4,666,081 to Cook et al., the teachings of which are incorporated by reference herein.

The Cook system of simply varying the duty cycle of the control signal is flawed for the following reasons. The present inventors have found that such a system does not work satisfactorily, owing to the long delay from when power is first supplied to the heater on the wax expandable element to the time when the valve actually begins to open. This lag time or delay causes the pulse width modulation control logic to continually increase the "on time" of the output signal with respect to the "off time" during the time it takes the heater to get hot enough to move the valve. Once the valve finally begins to open, the duty cycle of the pulse width modulation output ends up being too great and causes the valve to open too far for the required flow; the desired temperature target is overshot. As a result, the system is unstable and oscillates at a low frequency. The present inventors discovered that, in a closed loop control system, the time to heat the expandable element to the point at which it begins to actively control the valve (i.e., to the point where the valve is accurately responsive to the pulsed control signal) needs to be controlled. Cook et al. do not address this problem with using a valve having a heat-expandable element, nor do Cook et al. address the problem with regard to any other type of valve having a electric actuator in which an inherent lag time in powering up is present.

SUMMARY OF THE INVENTION

An object of the invention is to provide a method of controlling a valve in a hydronic heating or cooling system which is simple and inexpensive.

Another object of the invention is to provide a method of controlling a valve in a hydronic heating or cooling system which eliminates the need for three-way or four-way mixing valves.

Another object of the invention is to provide a hydronic heating or cooling system which is easy to repair, utilizes simple and well-known components, and effectively achieves the desired heat transfer with minimum complexity and cost.

The above and other objects and advantages are achieved through the invention, which includes a method of controlling or modulating a valve.

Other objects, advantages and features of the invention will become more apparent hereinafter. The valve in question preferably has a closing member movable between an open position and a closed position and an actuator for moving the closing member. The method includes the step of supplying power to the actuator in a series of intermittent cycles so that power is supplied during a first portion of each of the cycles and not supplied during a second portion of each of the cycles. Further, the valve is pre-powered for a predetermined period of time to overcome inherent lag time in the valve. By varying the power duty cycle to the actuator, the position of the valve may be varied in an intermediate position between open and closed. By pre-powering the valve for a predetermined period of time, the lag time of the valve is compensated for, the valve is thus responsive to a pulsed control signal, and the valve may be used effectively to control system fluid temperature. This obviates the need for using an expensive and complicated multi-port valve such as a three-way or a four-way valve.

The invention also includes a hydronic heating system utilizing a valve to which power is supplied intermittently. The system preferably possesses primary and secondary loops.

DETAILED DESCRIPTION OF THE INVENTION

The invention is an improvement to the conventional methods described above. It utilizes a simple low-cost two-position valve which can be controlled to regulate the amount of flow of boiler water to the radiation system and thus the temperature of the water in the secondary loop.

Figure 3:
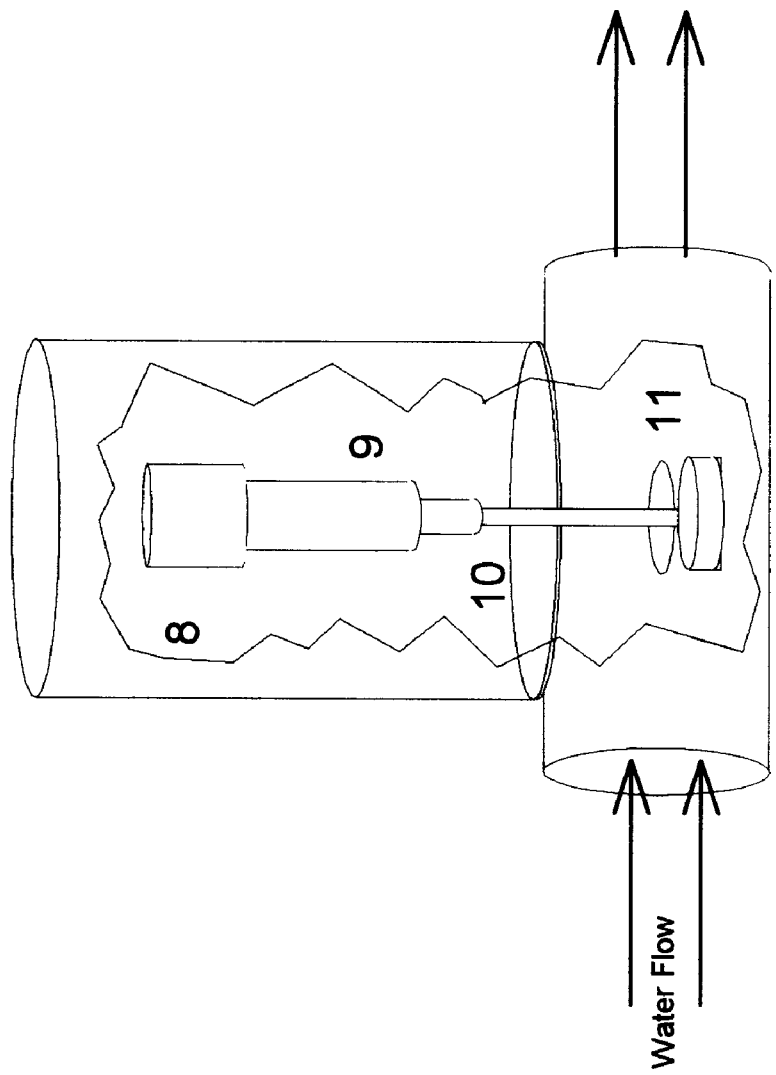
FIG. 3 is a cut-away diagram showing the internal components of a conventional solid element valve.
Figure 4:
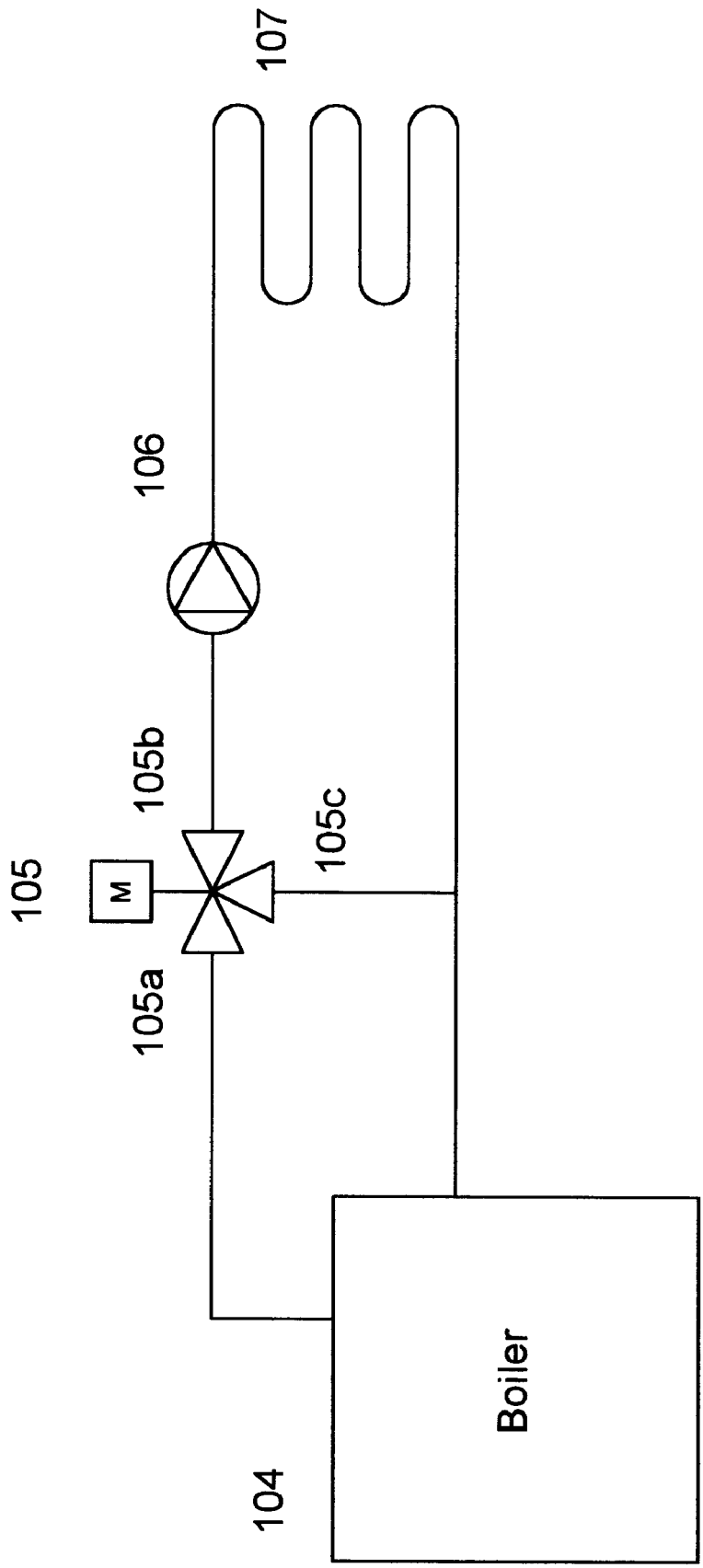
FIG. 4 is a diagram showing the elements of a conventional hydronic heating system employing a three-way valve.
Figure 5:
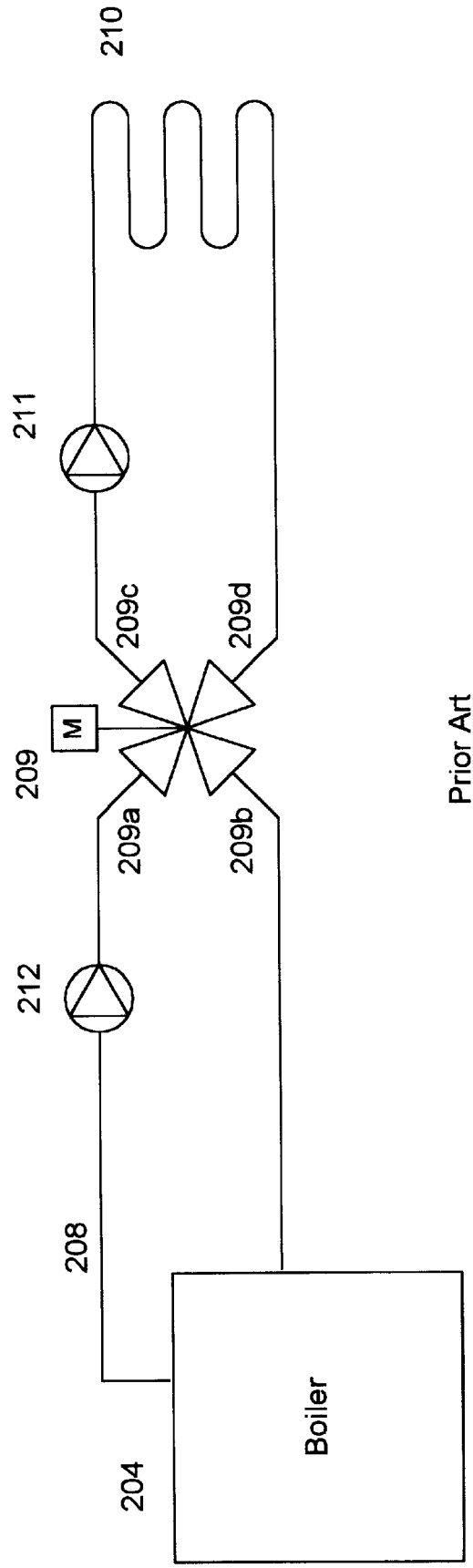
FIG. 5 is a diagram showing the elements of a conventional hydronic heating system employing a four-way valve.

A typical solid element valve such as is illustrated in FIG. 3 is employed. Instead of supplying power to the heater of the valve in a continuous manner as is done conventionally, power is supplied intermittently in an on-off cycle to maintain the valve in any intermediate (i.e., partially open) position, as well as a fully open or a fully closed position.

Figure 6:
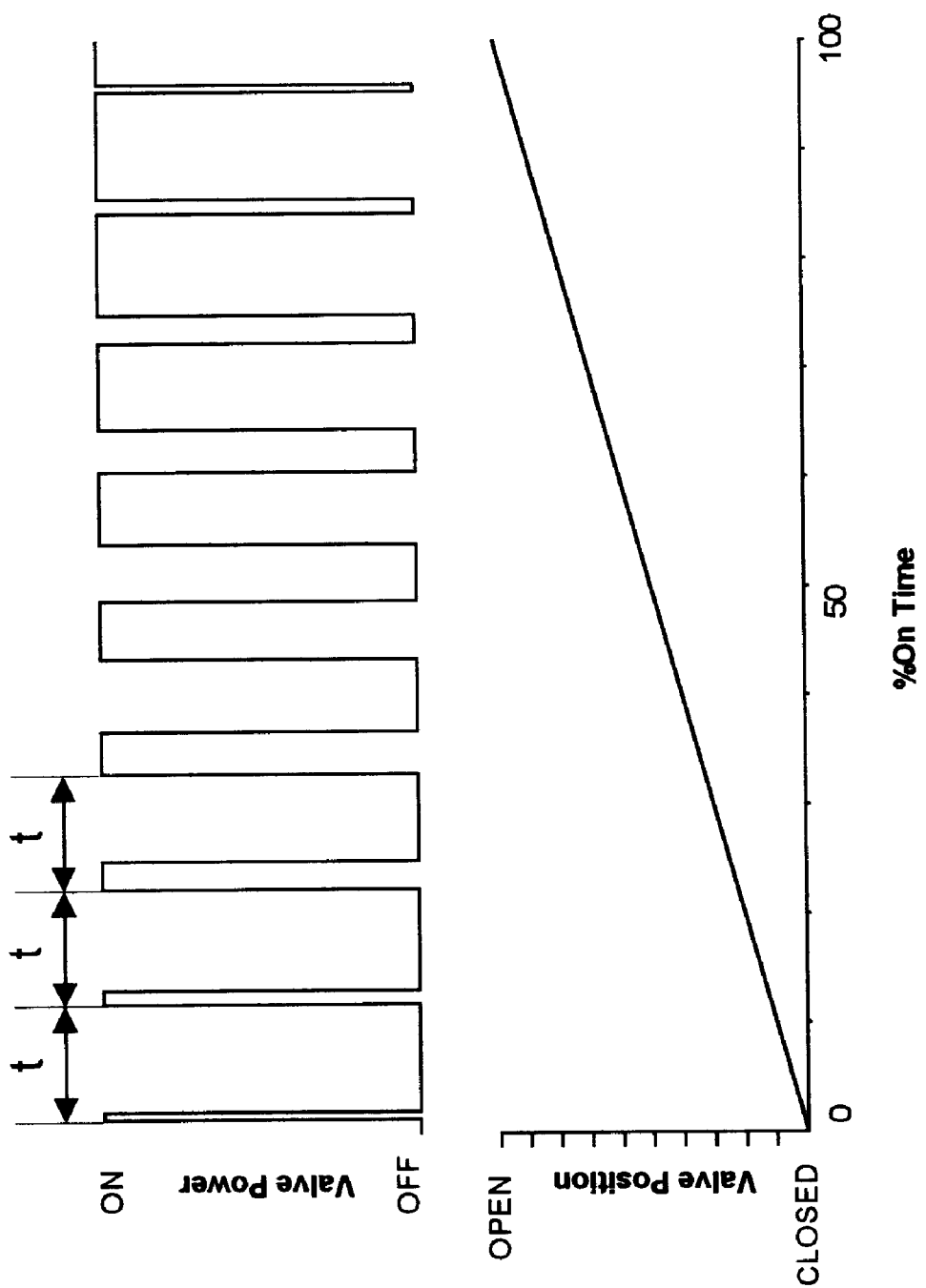
FIG. 6 is a graph showing a valve control method with the position of the valve being a function of the duty cycle to the valve.

The method operates as follows, with reference being made to FIGS. 3, 6, and 9. Power is supplied to electric heater 8 not continuously but intermittently in a duty cycle having a period t. In a first portion of each cycle, power is supplied, and in a second portion of the cycle power is not supplied. As shown in FIG. 6, the power-on portion of the duty cycle occurs first; however, the power-off portion may alternatively occur first. During the power-on portion of the cycle, heater 8 heats cylinder 9 and causes it to expand, thereby displacing piston 10 and opening valve 11. During the power-off portion of the cycle, heater 8 is not powered and cylinder 9 will not continue to expand. By the time cylinder 9 has cooled sufficiently to cause it to contract, the next power-on period from the next cycle occurs. That is, since power can be cycled faster than the thermal response time of the valve, the valve will maintain a stable position and will not oscillate. This stability is the result of the inherent lag time in the processes of heating/cooling the heater and transferring heat to/from the wax cylinder.

FIG. 6 shows that by varying the ratio of on to off time of valve power, it is theoretically possible to maintain any desired intermediate valve position. The greater the ratio of on to off time per cycle, the more heat is delivered by heater 8 to cylinder 9, the further piston 10 is supposed to be displaced, and thus the further valve 11 is supposed to be opened. If, as shown on the left side of FIG. 6, power is supplied only for a small portion of the cycle, a small amount of heat will be generated by the heater per cycle, and the valve will be opened only to a small extent. If, as shown on the right side of FIG. 6, power is supplied for a great portion of the duty cycle, a larger amount of heat will be generated by the heater per cycle, and the valve will be opened to a greater extent.

However, an inherent lag in the responsiveness exists in most valves. If a valve employs a heatable, expandable wax element to move the valve between open and closed positions, for example, there is a long delay in time from when power is first supplied to the heater on the wax expandable element to the time when the valve actually begins to open. This lag time or delay causes the pulse width modulation control logic to continually increase the "on time" of the output signal with respect to the "off time" during the time it takes the heater to get hot enough to move the valve. Once the valve finally begins to open, the duty cycle of the pulse width modulation output ends up being too great and causes the valve to open too far for the required flow; the desired temperature target is overshot. As a result, the system is unstable and oscillates at a low frequency.

In a closed loop control system, the time to heat the expandable element to the point at which it begins to actively control the valve (i.e., to the point where the valve is accurately responsive to the pulsed control signal) needs to be controlled. The inventive solution is to determine if the heater on the wax element (or the actuator on any electrically controlled valve) is, at an instantaneous point in time, actively being controlled. If it is not receiving an active pulse width modulated signal, the valve is provided with a steady state of an "on" signal for a predetermined amount of time to warm up the valve heater. This warm-up period may be required to enable the valve to be sufficiently responsive to the pulse width modulated signal; without the provision of the warm-up period, the precise control of the valve is difficult to achieve.

The predetermined warm-up period is based on how long it is necessary for the valve to begin to open. At the end of this warm-up period, the pulse width modulated signal is output to the valve. If, during the warm-up period, the actual system temperature crosses (e.g., exceeds in the heating mode) the target temperature, the warm-up timer is deactivated and normal pulse width modulation to the valve is begun. Should the secondary system temperature be raised (or lowered) to the desired target temperature by the pre-heating cycle alone, the control system is still put into the pulse width modulation portion of the logic so that occasional small pulses needed to maintain the target temperature are generated. It is possible for the pulse width calculator to determine that, for a given cycle or cycles, the width of the "on" portion of the duty cycle is zero.

Figure 1:
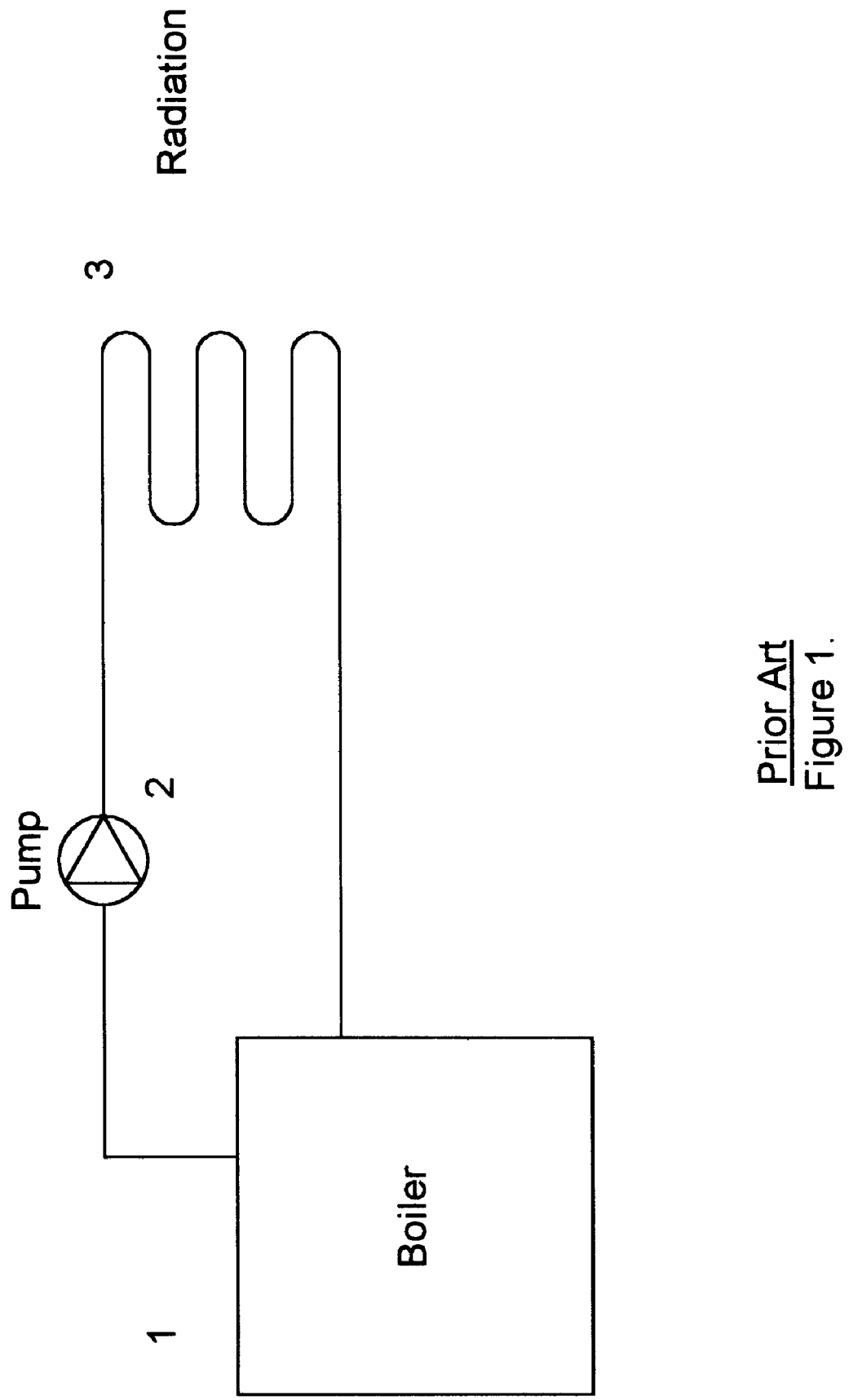
FIG. 1 is a diagram showing the elements of a conventional hydronic heating system.
Figure 2:
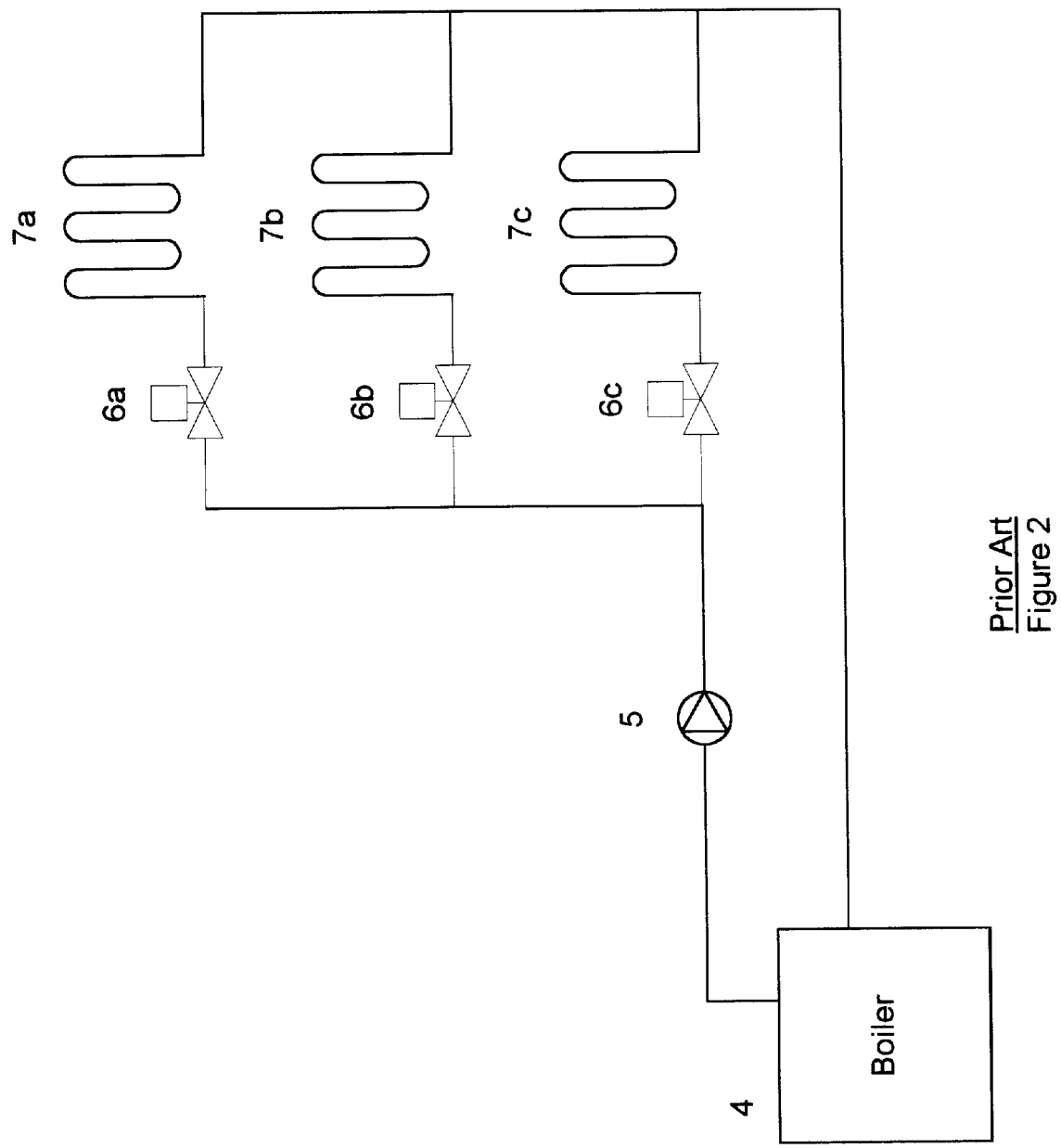
FIG. 2 is a diagram showing the elements of a conventional multiple zone hydronic heating system.

The inventive method and system are described above as being applied to a valve having an electric heater and an expanding cylinder. However, it is equally applicable to any other valve having an electric-powered actuator, as long as the duty cycle period is selected to be shorter than the response time of the valve when preheated. Similarly, the inventive method has been described as being applied to a valve which when unpowered is closed and which must be powered open. However, it is equally applicable to a valve which is open when unpowered and which must be powered closed. In either case, varying the on-to-off ratio of the duty cycle will vary the position of the valve in any intermediate position from full open to full closed, and a system which checks if a pre-powered warm-up period is required will insure proper valve responsiveness to variations in the duty cycle. In this way, flow of boiler water to a single radiation device as in FIG. 1 or multiple radiation devices as in FIG. 2 can be adjusted continuously rather than simply in an on-off fashion. An expensive and complicated three-way valve may thus be eliminated and replaced with an inexpensive and simple two-way valve controlled by the inventive method.

Figure 7:
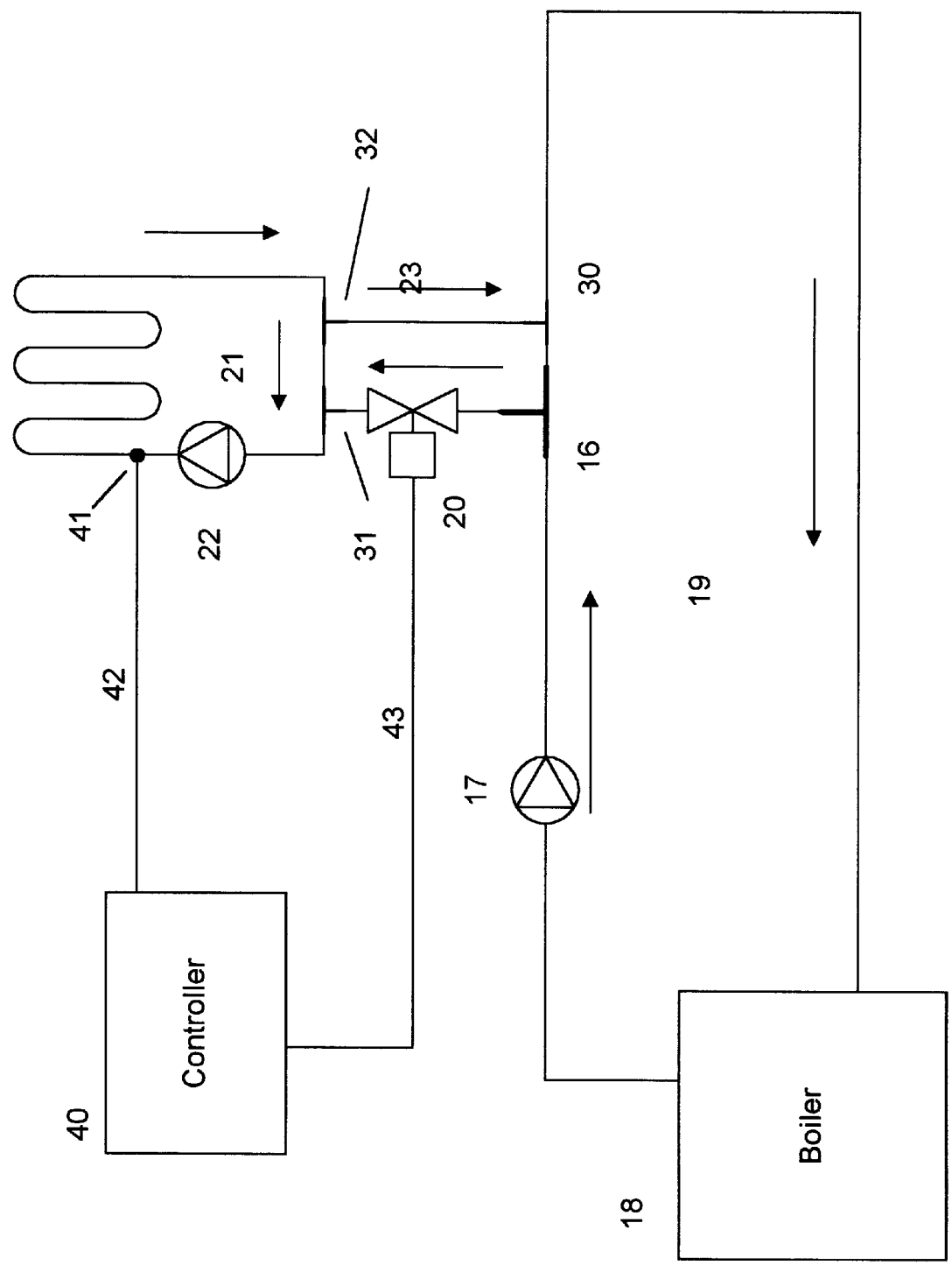
FIG. 7 is a diagram of a hydronic heating system utilizing the inventive method.

The inventive method and apparatus can also be used to replace an expensive and complicated four-way valve with a simple and inexpensive two-way valve. FIG. 7 shows a passive injection system that utilizes the inventive method. A similar system is described in co-pending application 08/925,103, entitled Passive Injection System Used to Establish a Secondary System Temperature, invented by one of the inventors of the present invention and assigned to the same assignee as the present invention, the teachings of which are herein incorporated by reference. As before, FIG. 7 illustrates a system with a single heating zone, however multiple zones may be configured similarly; additional zones with like structure are not illustrated.

As shown in FIG. 7, boiler 18 supplies a primary loop 19 through pump 17 with the output of boiler 18 passing through pump 17 and to a Venturi tee 16. The primary loop output of Venturi tee 16 is joined at tee connection 30 with return 23 from secondary loop 21. The output of tee 30 is returned to boiler 18.

The intermediate output of Venturi tee 16 is supplied to valve 20, the output of which is supplied to the secondary loop 21 at tee connection 31. Valve 20 is a simple two-way valve controlled by the inventive method in a manner to be described below. Pump 22 is provided within secondary loop 21 to circulate the fluid medium, such as water, within the loop. Return path 23 between secondary loop 21 and primary loop 19 is effected through tee connection 32 located at the entry point of return 23, with tee 32 connected within secondary loop 21. Flow through return path 23 and valve 20 are always equal.

Figure 8:
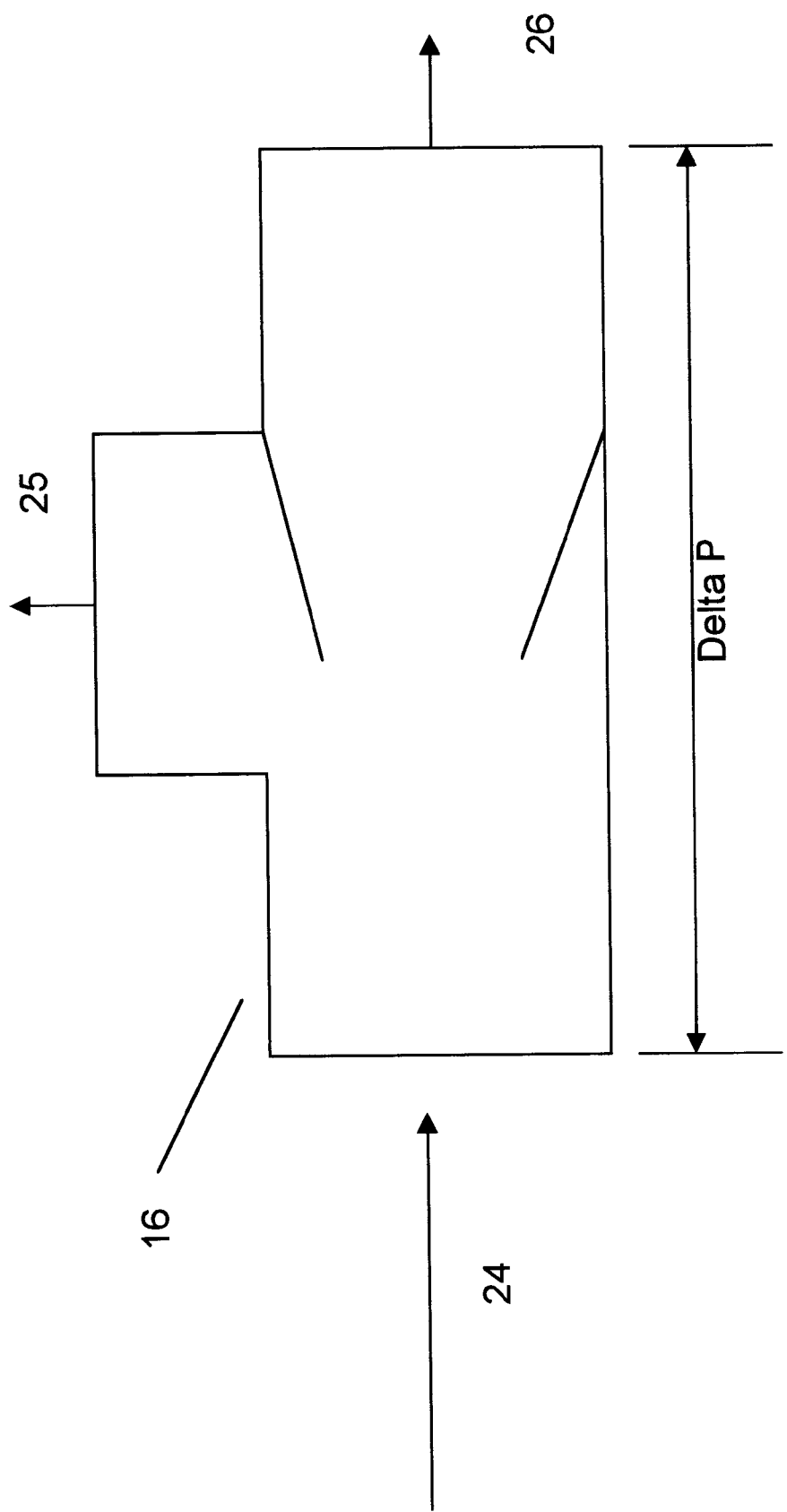
FIG. 8 is a cross-sectional view of a Venturi tee employed in the system illustrated in FIG. 7.

FIG. 8 illustrates Venturi tee 16, with numeral 24 representing the output of pump 17 and numeral 26 representing the flow from Venturi tee 16 to tee 30 which joins return path 23 before supplying the combined return to boiler 18. Numeral 25 represents the injection flow output. Owing to its sloped walls, the Venturi tee has a high pressure end at 24 and a lower pressure end at 26. The difference between those pressures and the difference between the pressure at output 26 and the exit port of tee 32 causes a drawing of fluid along path 23 between the secondary and primary loops. By controlling the flow between Venturi tee 16 and secondary loop 21 through valve 20, the temperature in the secondary loop may be controlled.

The Venturi tee is a passive pressure sensitive apparatus connected between the primary and secondary systems which allows fluid flow between those systems without the need of an expensive three- or four-way valve. By use of Venturi tee 16, the flow in primary loop 19 creates a pressure drop across the run of the tee. When the flow control valve 20 is open, boiler water flows into secondary loop 21, and an amount of flow equal to the amount of induced flow through control valve 20 returns to primary loop 20 via return path 23. When control valve 20 is closed, no water moves between the primary and secondary loops, and the secondary loop remains at ambient temperature.

Figure 9:
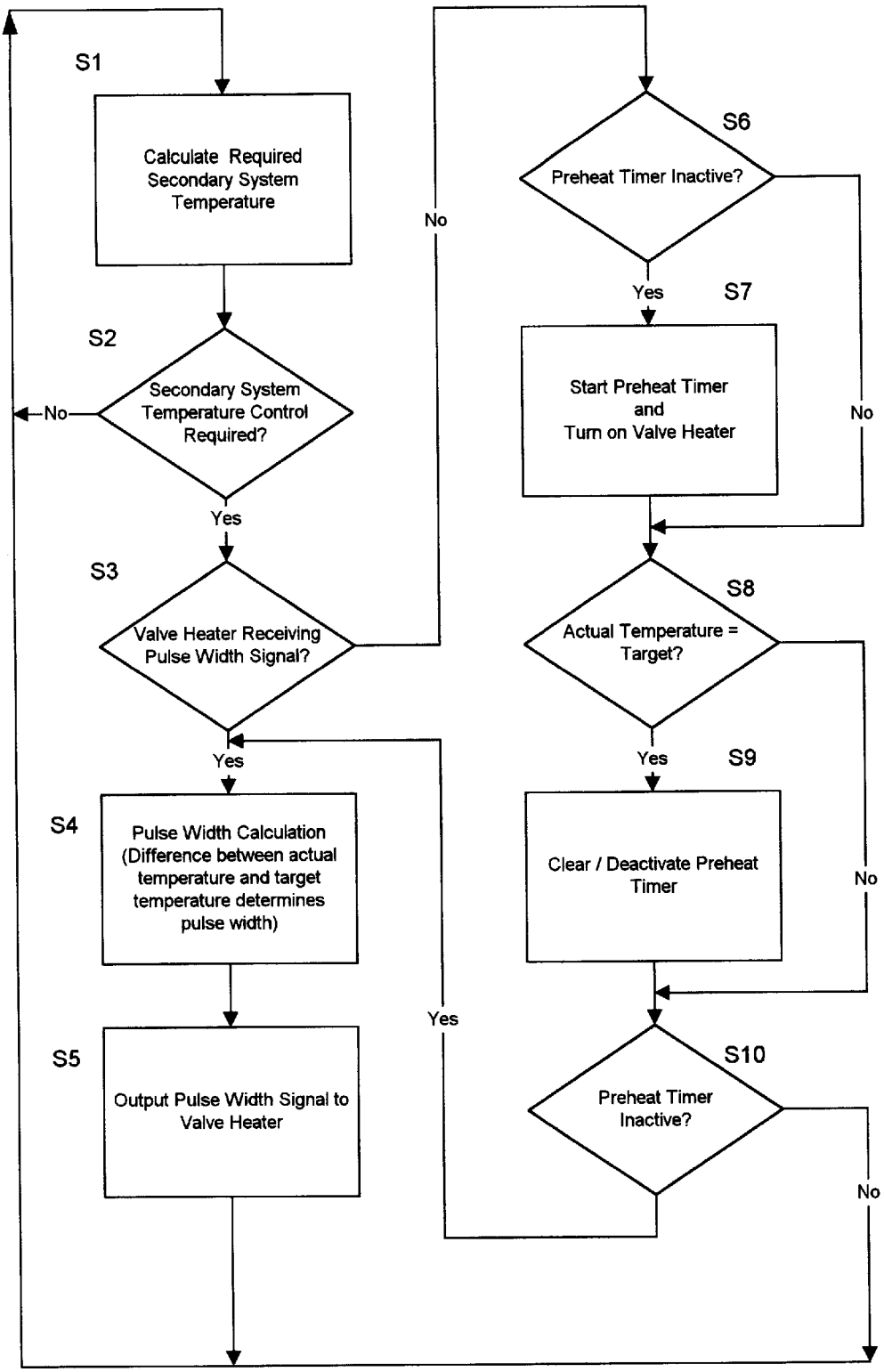
FIG. 9 is a flow chart showing a valve control method according to the invention which compensates for the inherent lag in response time of most valves.

A flow chart of the logic of the control system of the present invention is depicted in FIG. 9. The example being given is directed to a system as shown in FIG. 7 having a valve as shown in FIG. 3, however it is to be understood that the invention is not limited to only such a system or that type of valve. Any type of valve having an inherent warm-up response lag is contemplated as being included within the scope of the invention, and those skilled in the art are aware to which valves the invention is applicable.

First, in step S1, the target temperature required in the secondary system, loop 21, is calculated. This temperature may be based on one or more inputs, including the ambient temperature of a room, the temperature set on a thermostat, and the like. The temperature of the secondary system fluid is determined via conventional temperature sensing means such as a thermocouple. The thus-measured secondary system temperature is compared, at step S2, to the target temperature of step S1. If the actual temperature equals the target temperature, then no temperature control is required, and the logic cycles back to step S1. If the actual temperature does not equal the target temperature, temperature control is required, and the system proceeds to step S3.

At step S3, it is determined if the valve heater is currently receiving pulsed signals. If it is, the pulse width calculator determines, at step S4, how much "on" and how much "off" is required in the duty cycle to bring the system temperature to the target temperature. That on-off pulse is output to the valve heater in step S5. However, if at step S3 the valve heater is not in the process of receiving a modulated pulse width signal, the system determines if a preheat timer is active or not at step S6. The preheat timer is the part of the logic which measures the predetermined amount of time that the valve heater preliminarily requires a "full on" signal so that the valve is subsequently thermally responsive to variations in the pulse width modulated signal.

At step S6, if the preheat timer is inactive, the preheat timer and the valve heater are activated at step S7. If the preheat timer is already running at step S6, the logic checks to see if the system temperature equals the target temperature at step S8. If the target temperature has been reached, the preheat timer is deactivated at step S9. If the target temperature has not been reached, the logic checks to see if the preheat timer is inactive or not at step S10. If the preheat timer is still active (the "no" branch of step S10), then the control system cycles back to step S1. If the preheat timer is no longer active (the "yes" branch), that means that the predetermined preheat period has elapsed, and the valve is now sufficiently responsive to variations in the duty cycle of the heater. Consequently, the control system shifts back to step S4 to calculate the required pulse width modulation to make the actual temperature move towards the target temperature. It is preferred that, when the preheat timer is deactivated at step S9, the control signal to the valve heater is kept on; within microseconds, the logic has moved back to step S4 where an appropriate pulse width output will be calculated and sent to the valve heater at step S5.

By varying the induced flow rate by means of control valve 20, the temperature of the secondary loop may be varied between the ambient temperature of the secondary loop and the boiler temperature of the primary loop. The system is provided with controller 40 for controlling the position of valve 20 and thus for controlling the induced flow rate. Controller 40 provides power to valve 20 via line 43 in an intermittent fashion in accordance with the inventive method. That is, controller 40 powers valve 20 with an intermittent duty cycle according to the flow chart of FIG. 9, such that the valve can be maintained in a fully open position, a fully closed position, or any partially open position therebetween. The output signals to the valve heater, be they a preheat full-on signal as generated at step S7 or a pulsed signal as generated at step S5, originate from controller 40 and are transmitted via line 43.

Thermocouple 41 or any other conventional temperature sensing device is placed in secondary loop 21, and sends temperature data to controller 40 via line 42. Thermocouple 41 provides the secondary system temperature for controller 40 to compare to the target temperature at step S2 in the flow chart. The controller can then vary the on-to-off ratio of the duty cycle of the valve, thereby varying the position of the valve, and thus the amount of boiler water that enters the secondary loop from the primary loop. In this way, the temperature of the secondary loop may be regulated by varying the duty cycle of the valve. If it is desired to increase the temperature in secondary loop 21, controller 40 will increase the on-to-off ratio of the duty cycle of the valve via line 43, and the valve will open more. Additional boiler water will enter the secondary loop via Venturi tee 16 and valve 20, and the secondary loop temperature will increase. If it is desired to decrease the secondary loop temperature, controller 40 reduces the on-to-off ratio of the duty cycle of valve 20, and the valve will close. Less boiler water will enter the secondary loop via Venturi tee 16 and valve 20, and the secondary loop temperature will drop.

The controller may be a manual controller requiring operator input, or alternatively may be an automatic controller which will vary the duty cycle of the valve when the temperature sensed by sensor 41 falls below a pre-set threshold.

What is claimed is:

1. A method of modulating a valve, the valve having a closing member movable between an open position and a closed position and an electric actuator for moving the closing member, said method comprising the steps of:
   a) pre-powering the electric actuator for a predetermined period of time; and
   b) supplying power to the electric actuator in a series of intermittent cycles so that power is supplied during a first portion of each of said cycles and not supplied during a second portion of each of said cycles.

2. A valve modulating method according to claim 1, wherein said step b) further comprises the step of: c) maintaining the closing member in any position intermediate the open position and the closed position so that the valve is partially open.

3. A valve modulating method according to claim 1, wherein the greater the ratio of the first portion of the cycle to the second portion of the cycle is, the closer to one of the open position and the closed position the closing member is.

4. A valve modulating method according to claim 2, wherein the greater the ratio of the first portion of the cycle to the second portion of the cycle is, the closer to one of the open position and the closed position the closing member is.

5. A valve modulating method according to claim 1, further comprising the step of: d) selecting a cycle duration shorter than a response time of the valve.

6. A valve modulation method according to claim 1, said pre-powering step a) comprising the steps of:
- e) determining if the valve is responsive to being controlled via said power supply step b);
- f) activating a timer to measure how much of the predetermined period of time has elapsed if it is determined in step e) that the valve is not responsive;
- g) supplying power to the actuator for the predetermined period of time.

7. A valve modulation method according to claim 6, wherein, after steps E–G are performed, the valve is responsive to being controlled via step b).

8. A valve modulation method according to claim 7, wherein when the valve is responsive to being controlled via step b), the closing member is maintainable in any position intermediate the open position and the closed position.

9. A valve modulation method according to claim 1, wherein said pre-powering step a) may be performed whenever step b) is not being performed.

10. A valve modulation method according to claim 1, the valve being used to control a fluid temperature by way of the position of the closing member, further comprising the step of: i) disabling step a) if the fluid temperature to be controlled has reached a target temperature.

11. A method of modulating a valve according to claim 1, wherein the losing member is a piston movable between a first position and a second position for opening and closing the valve, and wherein the electric actuator includes a cylinder connected to the piston and filled with a substance that expands when heated and an electric heater in thermal communication with the cylinder for heating the cylinder and expanding the substance and thereby displacing the piston from the first position towards the second position,
- wherein said pre-powering step a) further comprises preheating the substance with the electric heater for a predetermined period of time; and
- wherein said power supplying step b) further comprises varying the position of the piston by varying a duty cycle of the heater.

12. A valve modulating method according to claim 11, wherein said position-varying step b) further comprises the step of: c) maintaining the piston in any position intermediate the first and second positions so that the valve is partially open.

13. A valve modulating method according to claim 11, wherein the displacement of the piston is directly proportional to a power-on to power-off ratio of the duty cycle.

14. A valve modulating method according to claim 11, further comprising the step of:
- d) selecting a duty cycle duration shorter than a response time of the valve.

15. A valve modulation method according to claim 11, said preheating step a) comprising the steps of:
- e) determining if the valve is responsive to being controlled via step b);
- f) activating a timer to measure how much of the predetermined period of time has elapsed if it is determined in step e) that the valve is not responsive;
- g) supplying power to the heater for the predetermined period of time.

16. A valve modulation method according to claim 11, wherein, after steps E–G are performed, the valve is responsive to being controlled via step b).

17. A valve modulation method according to claim 11, wherein said pre-powering step a) may be performed whenever step b) is not being performed.

18. A valve modulation method according to claim 11, the valve being used to control a fluid temperature by way of the position of the closing member, further comprising the step of: i) disabling step a) if the fluid temperature to be controlled has reached a target temperature.

19. A method of modulating a valve, the valve having a closing member movable between an open position and a closed position and an electric actuator for moving the closing member, said method comprising the steps of:
- a) initializing the electric actuator so that it will be responsive; and
- b) supplying power to the initialized actuator in a series of intermittent cycles so that power is supplied during a first portion of each of said cycles and not supplied during a second portion of each of said cycles.

* * * * *